(12) United States Patent
Shido et al.

(10) Patent No.: US 10,815,395 B2
(45) Date of Patent: Oct. 27, 2020

(54) DECORATIVE SHEET

(71) Applicant: AICA KOGYO CO., LTD., Kiyosu-shi, Aichi (JP)

(72) Inventors: Kazuya Shido, Ama (JP); Kazuki Kouyama, Ama (JP); Keisuke Shitan, Ama (JP)

(73) Assignee: AICA KOGYO CO., LTD., Kiyosu-shi, Aichi (JP)

( * ) Notice: Subject to any disclaimer, the term of this patent is extended or adjusted under 35 U.S.C. 154(b) by 42 days.

(21) Appl. No.: 15/743,346

(22) PCT Filed: Jul. 5, 2016

(86) PCT No.: PCT/JP2016/069898
§ 371 (c)(1),
(2) Date: Jan. 10, 2018

(87) PCT Pub. No.: WO2017/010352
PCT Pub. Date: Jan. 19, 2017

(65) Prior Publication Data
US 2018/0201810 A1    Jul. 19, 2018

(30) Foreign Application Priority Data

Jul. 10, 2015 (JP) .................................. 2015-138203

(51) Int. Cl.
*C09J 7/29* (2018.01)
*B32B 5/02* (2006.01)
(Continued)

(52) U.S. Cl.
CPC ................... *C09J 7/29* (2018.01); *B32B 5/02* (2013.01); *B32B 17/04* (2013.01); *B32B 29/005* (2013.01);
(Continued)

(58) Field of Classification Search
CPC ....... Y10T 428/24942; Y10T 428/2495; Y10T 428/24959; Y10T 428/24967;
(Continued)

(56) References Cited

U.S. PATENT DOCUMENTS 4,371,579 A * 2/1983 McCaskey .............. B32B 19/02
428/204
10,449,748 B2 * 10/2019 Yasui ..................... A47B 96/18
(Continued)

FOREIGN PATENT DOCUMENTS

JP    S63-192025    12/1988
JP    H0496330     8/1992
(Continued)

OTHER PUBLICATIONS

Machine translation (Google translate) of JP 2004-358814 A. Translated May 23, 2019. (Year: 2019).*
(Continued)

*Primary Examiner* — Maria V Ewald
*Assistant Examiner* — Ethan A. Utt
(74) *Attorney, Agent, or Firm* — Grossman, Tucker, Perreault & Pfleger, PLLC

(57) ABSTRACT

A decorative sheet according to one aspect of the present disclosure comprises a decorative plate and an adhesive layer disposed on a first side of the decorative plate. The decorative plate comprises (A) a decorative layer disposed on a second side from the first side, (B) a core layer made of a prepreg containing a fiber base material, and (C) a balancing layer including mixed paper containing an endothermic metal hydroxide as a base material.

9 Claims, 3 Drawing Sheets

(51) Int. Cl.
- *B32B 29/00* (2006.01)
- *B44C 5/04* (2006.01)
- *B32B 17/04* (2006.01)
- *C09J 201/00* (2006.01)
- *B32B 37/18* (2006.01)
- *B32B 38/00* (2006.01)
- *C08K 7/14* (2006.01)

(52) U.S. Cl.
CPC ........ *B32B 37/182* (2013.01); *B32B 38/0004* (2013.01); *B44C 5/0469* (2013.01); *C09J 201/00* (2013.01); *B32B 2250/03* (2013.01); *B32B 2255/02* (2013.01); *B32B 2255/26* (2013.01); *B32B 2260/028* (2013.01); *B32B 2260/046* (2013.01); *B32B 2262/101* (2013.01); *B32B 2307/3065* (2013.01); *B32B 2309/10* (2013.01); *B32B 2309/105* (2013.01); *B32B 2451/00* (2013.01); *B32B 2479/00* (2013.01); *C08K 7/14* (2013.01); *C09J 2205/106* (2013.01); *C09J 2409/00* (2013.01); *C09J 2431/006* (2013.01); *C09J 2433/00* (2013.01); *C09J 2433/006* (2013.01)

(58) Field of Classification Search
CPC ........... Y10T 428/24975; Y10T 428/26; Y10T 428/266; Y10T 428/269; Y10T 428/27; Y10T 428/28; Y10T 428/2804; Y10T 428/2809; Y10T 428/2813; Y10T 428/2817; Y10T 428/2822; Y10T 428/2826; Y10T 428/283; Y10T 428/2835; Y10T 428/2839; Y10T 428/2843; Y10T 428/2848; Y10T 428/2852; Y10T 428/2857; Y10T 428/2861; Y10T 428/2865; Y10T 428/287; Y10T 428/2874; Y10T 428/2878; Y10T 428/2883; Y10T 428/2887; Y10T 428/2891; Y10T 428/2896; Y10T 442/119; Y10T 442/155; Y10T 442/157; Y10T 442/19; Y10T 442/3634; Y10T 442/3927; Y10T 442/3935; Y10T 442/3943; Y10T 442/693; Y10T 428/31504; Y10T 428/31511; Y10T 428/31518; Y10T 428/31522; Y10T 428/31525; Y10T 428/31529; Y10T 428/31786; Y10T 428/3179; Y10T 428/31794; Y10T 428/31797; Y10T 428/31855; Y10T 428/31859; Y10T 428/31862; Y10T 428/31866; Y10T 428/3187; Y10T 428/31873; Y10T 428/31877; Y10T 428/3188; Y10T 428/31884; Y10T 428/31888; Y10T 428/31891; Y10T 428/31895; Y10T 428/31899; Y10T 428/31902; Y10T 428/31906; Y10T 428/31909; Y10T 428/31913; Y10T 428/31917; Y10T 428/3192; Y10T 428/31924; Y10T 428/31928; Y10T 428/31931; Y10T 428/31935; Y10T 428/31938; Y10T 428/31942; Y10T 428/31946; Y10T 428/31949; Y10T 428/31953; Y10T 428/31957; Y10T 428/3196; Y10T 428/31964; Y10T 428/31967; Y10T 428/31971; Y10T 428/31975; Y10T 428/31978; Y10T 428/31982; Y10T 428/31996; Y10T 428/31993; B44C 5/00; B44C 5/04; B44C 5/0469; B44C 5/0476; C09J 7/00; C09J 7/20; C09J 7/21; C09J 7/22; C09J 7/24; C09J 7/241; C09J 7/243; C09J 7/245; C09J 7/25; C09J 7/255; C09J 7/29; C09J 7/30; C09J 7/32; C09J 7/35; C09J 7/38; C09J 7/381; C09J 7/383; C09J 7/385; C09J 7/387; C09J 7/40; C09J 7/401; C09J 7/403; C09J 7/405; C09J 7/50; B32B 5/00; B32B 5/02; B32B 5/022; B32B 5/024; B32B 5/026; B32B 5/028; B32B 5/22; B32B 5/24; B32B 5/26; B32B 5/28; B32B 29/00; B32B 29/002; B32B 29/005; B32B 29/02; B32B 27/00; B32B 27/02; B32B 27/04; B32B 27/06; B32B 27/08; B32B 27/10; B32B 27/12; B32B 27/18; B32B 27/28; B32B 27/30; B32B 27/308; B32B 27/36; B32B 27/38; B32B 27/42

USPC ....... 428/212–216, 219, 220, 332, 337, 339, 428/340, 343–356, 355 R, 355 RA, 428/355 CP, 355 EP, 355 AK, 355 EN, 428/355 BL, 355 CN, 355 AC, 355 N, 428/411.1, 413–418, 480–483, 500–527, 428/530–536, 537.5, 542.2, 542.6; 162/100–231, 157.1–157.7, 164.1–164.7, 162/168.1–168.7, 181.1–181.9; 442/12, 442/33, 34, 52, 259, 295–297, 412

See application file for complete search history.

(56) References Cited

U.S. PATENT DOCUMENTS

2013/0089748 A1* 4/2013 Taillan .................. B32B 29/005
                                                             428/535
2014/0242871 A1   8/2014 Yasui et al.

FOREIGN PATENT DOCUMENTS

| JP | H0681296 | 3/1994 | |
|---|---|---|---|
| JP | H1143543 | 2/1999 | |
| JP | 2004358814 A * | 12/2004 | |
| JP | 2005-199532 | 7/2005 | |
| JP | 2005199532 A * | 7/2005 | |
| JP | 2005-212424 | 8/2005 | |
| JP | 2010202750 | 9/2010 | |
| JP | 2012-012742 | 1/2012 | |
| JP | 2013-099939 | 5/2013 | |
| TW | 201336447 | 9/2013 | |
| WO | WO-2013054897 A1 * | 4/2013 | ............... B32B 5/28 |

OTHER PUBLICATIONS

Machine translation (J-PlatPat) of JP 2005-199532 A. Translated May 23, 2019. (Year: 2019).*
Ash, Michael Ash, Irene. (2009). Industrial Chemical Thesaurus (5th Edition)—Ammonium hexachloroplatinate to Ammonium polyphosphate. (pp. 160-161). Synapse Information Resources, Inc.. Retrieved from app.knovel.com/hotlink/pdf/id:kt008H95X1/industrial-chemical-thesaurus/ammonium-hexachloroplatinate (Year: 2009).*
English translation of International Search Report from corresponding PCT Appln. No. PCT/JP2016/069898, dated Aug. 30, 2016.
Office Action from related Taiwanese Appln. No. 105121223, dated Dec. 21, 2017. English translation attached.
English translation of International Preliminary Report on Patentability from corresponding PCT Appln. No. PCT/JP2016/069898, dated Jan. 25, 2018.
Office Action from related Indian Appln. No. 201837002145, dated Dec. 2, 2019. English translation attached.

(56) References Cited

OTHER PUBLICATIONS

Office Action from related Chinese Appln. No. 201680040605.0, dated Dec. 25, 2019. English translation attached.

* cited by examiner

DECORATIVE SHEET

CROSS-REFERENCE TO RELATED APPLICATIONS

This international application claims the benefit of Japanese Patent Application No. 2015-138203 filed on Jul. 10, 2015 with the Japan Patent Office, the entire disclosure of Japanese Patent Application No. 2015-138203 is incorporated in this international application by reference.

TECHNICAL FIELD

The present disclosure is related to a decorative sheet.

BACKGROUND ART

Melamine decorative plates made by stacking melamine-resin-impregnated decorative paper, phenol-resin-impregnated paper, and the like have been used for desks, tables, counters and so on.

To adhere such melamine decorative plate to a base material, such as a plywood, a particle board, a medium-density fiberboard, there is a method in which a glue is applied on the melamine decorative plate, and, after the glue dries, the melamine decorative plate is pressed and bonded to the base material. The problem in this method is that the time required for adhesion is long.

To solve this problem, a decorative sheet has been developed in which an adhesive layer is provided on the rear face of a decorative plate. For example, Patent Document 1 discloses a decorative sheet provided with, on the rear face of the decorative plate, an adhesive layer and a mold releasing sheet that covers the adhesive layer.

PRIOR ART DOCUMENTS

Patent Documents

Patent Document 1: Japanese Utility Model Application Publication No. S63-192025

SUMMARY OF THE INVENTION

Problems to be Solved by the Invention

Conventional decorative sheets tend to curl (curve) easily, due to which carrying and handling them has been difficult. In one aspect of the present disclosure, it is desirable to provide a decorative sheet that does not curl easily.

Means for Solving the Problems

One aspect of the present disclosure provides a decorative sheet that comprises a decorative plate and an adhesive layer disposed on a first side of the decorative plate. The decorative plate comprises (A) a decorative layer disposed on a second side from the first side, (B) a core layer made of a prepreg containing a fiber base material, and (C) a balancing layer including mixed paper containing an endothermic metal hydroxide as a base material.

Due to (C) the balancing layer including the mixed paper containing endothermic metal hydroxide as the base material, the decorative sheet according to the present disclosure can be inhibited from curling.

Figure 1:
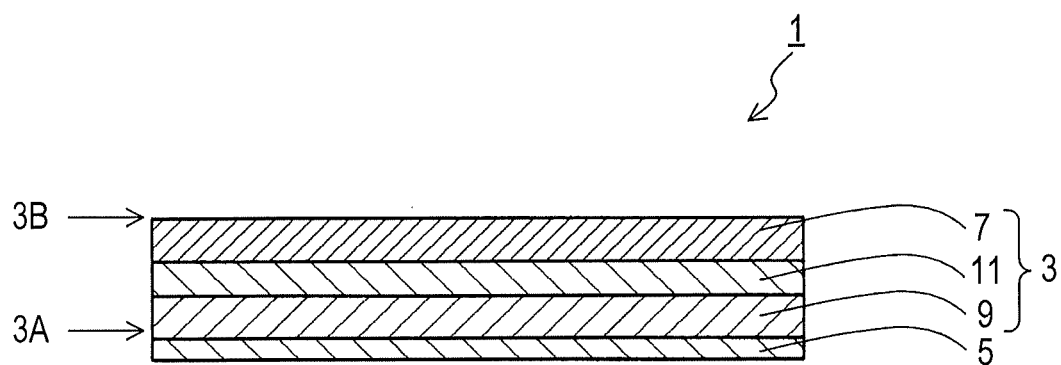
FIG. 1 is a sectional side elevation view showing a structure of a decorative sheet 1.

EXPLANATION OF REFERENCE NUMERALS 1, 101, 201 . . . decorative sheet, 3, 103, 203 . . . decorative plate, 5 . . . adhesive layer, 7 . . . decorative layer, 9 . . . core layer, 11 . . . balancing layer, 13 . . . first balancing layer, 15 . . . second balancing layer

MODE FOR CARRYING OUT THE INVENTION

Embodiments of the present disclosure will be described.

1. Decorative Layer

A decorative layer is a part of a decorative plate. The decorative layer is located in a side of the decorative plate opposite to where an adhesive layer is provided. Examples of the decorative layer include resin-impregnated decorative paper obtained by impregnating decorative paper, which will be used for a thermosetting resin decorative plate, with resin liquid and drying the impregnated decorative paper.

Examples of the resin liquid include, for example, resin liquid composed mainly of a thermosetting resin. Examples of the thermosetting resin include an amino-formaldehyde resin, a diallyl phthalate resin, an unsaturated polyester resin, or a mixture of these resins.

Preferred among the resins is the amino-formaldehyde resin, which is excellent in heat resistance, wear resistance, and so on. Especially preferred is the melamine-formaldehyde resin, which is excellent in water resistance, heat resistance, wear resistance, chemical resistance, and stain resistance.

The basis weight of the decorative paper used for a thermosetting resin decorative plate can be, for example, 30 to 140 g/m². When decorative paper used for a thermosetting resin decorative plate is impregnated with resin liquid, the impregnation rate of the resin liquid defined by Formula 1 is preferably 80 to 300%.

[Formula 1]

$$\text{Impregnation rate (\%)} = \frac{\text{Weight after impregnation} - \text{Weight before impregnation}}{\text{Weight before impregnation}} \times 100 \quad \text{(Formula 1)}$$

2. Core Layer

A core layer is a part of the decorative plate and is made of a prepreg containing a fiber base material. The prepreg is obtained by, for example, impregnating the fiber base material with a slurry containing a thermoplastic resin, which serves as a binder component, and endothermic metal hydroxide and drying the fiber base material. The core layer may comprise one sheet of the prepreg, or may comprise two or more sheets of the prepreg.

Examples of the fiber base material include an organic fiber base material and an inorganic fiber base material. Examples of the organic fiber base material include fibers made of polyethylene, polypropylene, vinylon, polyvinyl chloride, polyvinylidene chloride, polyacrylonitrile, polyamide, polyester, polyurethane, modifications these substances, various copolymers represented by ethylene-vinyl acetate copolymers and the like, and mixtures of these substances.

Examples of the inorganic fiber base material include nonwoven fabrics and woven fabrics made of inorganic fibers such as glass fibers, rock wool, and carbon fibers. The basis weight of the inorganic fiber base material is preferably in the range of 10 to 200 g/m$^2$. In a case where the inorganic fiber base material is used, the non-combustibility of the decorative plate is further improved as compared to a case where the organic fiber base material is used. In particular, in a case where a glass fiber nonwoven fabric is used among the inorganic fiber base materials, the finished base material has no fiber direction, thus curling of the decorative sheet can be further suppressed. Moreover, use of the glass fiber nonwoven fabric improves the flame resistance of the decorative sheet and the impregnation properties of the slurry.

In the role of the thermoplastic resin that serves as a binder component, an acrylic resin emulsion is preferably used. In particular, use of an acrylic resin emulsion having a glass transition temperature (Tg) of 0° C. or more improves the close adhesion and the formability of the core layer and thus is more preferable.

Among acrylic resin emulsions, use of an acrylic resin emulsion having an average particle diameter of 150 to 300 nm is furthermore preferable since such emulsion can further improve the binding force of the core layer, and the bending workability and the smoothness of the decorative plate. The reason for the improved smoothness of the decorative plate is assumed to be that the acrylic resin emulsion consists of microparticles. The average particle diameter is calculated with a laser beam diffraction/scattering particle diameter measuring device (ELS-8000 manufactured by Otsuka Electronics Co., Ltd.) based on scattered light detected at the time of laser irradiation.

The blending ratio of the thermoplastic resin in the slurry is preferably 3 to 17% by weight in solid equivalent. Blending 17% by mass or less of the thermoplastic resin further improves the non-combustibility of the decorative plate and the decorative sheet and reduces an occurrence of exudation of the thermoplastic resin while the decorative plate or the decorative sheet is formed under heat and pressure. Blending 3% by mass or more of the thermoplastic resin further improves the close adhesion between the prepregs and allows easier control over the amount of impregnation of the fiber base material with the slurry.

The amount of the thermoplastic resin contained in the core layer (the weight of the thermoplastic resin contained in the core layer per unit area) is preferably 10 to 100 g/m$^2$. Containing 100 g/m$^2$ or less of the thermoplastic resin further improves the non-combustibility of the decorative plate and the decorative sheet. Containing 100 g/m$^2$ or less of the thermoplastic resin also reduces an occurrence of exudation of the thermoplastic resin while the decorative plate is formed under heat and pressure.

The amount of the thermoplastic resin contained in the core layer being 10 g/m$^2$ or more further improves the close adhesion between the prepregs in a case where the core layer is made of the prepreg. The amount of the thermoplastic resin being 10 g/m$^2$ or more also allows for an easier control over the amount of impregnation of the slurry in a case where the fiber base material is impregnated with the slurry to produce the core layer.

Endothermic metal hydroxide contains crystal water and is decomposed at high temperatures so as to release water. Since this reaction is an endothermic reaction, endothermic metal hydroxide provides an effect of suppressing a temperature rise in the decorative plate during burning and thus improves the non-combustibility of the decorative plate and the decorative sheet according to the present disclosure.

Examples of endothermic metal hydroxide include aluminum hydroxide, magnesium hydroxide, and calcium hydroxide. In particular, aluminum hydroxide and magnesium hydroxide are preferably used. The blending ratio of endothermic metal hydroxide in the slurry is preferably 20 to 95% by weight. With this range of endothermic metal hydroxide, the close adhesion of the core layer is good and the non-combustibility of the decorative plate and the decorative sheet is improved.

The average particle diameter of endothermic metal hydroxide may be in the range of, for example, 1 to 50 μm. This average particle diameter is an arithmetic average diameter calculated from the particle size distribution (volume distribution) detected by a laser beam diffraction/scattering method (Microtrac method). Due to the average particle diameter of endothermic metal hydroxide being in the above-specified range, the dispersibility of endothermic metal hydroxide in the slurry and thus the impregnation properties of the slurry into the fiber base material are improved. Moreover, the decorative plate and the decorative sheet achieve smoothly finished surfaces.

The amount of endothermic metal hydroxide contained in the core layer (the weight of the endothermic hydroxide contained in the core layer per unit area) is preferably in the range of 100 to 300 g/m$^2$. Due to the amount of endothermic metal hydroxide within this range, in a case where the core layer is made of the prepreg, the close adhesion between the prepregs is increased and the non-combustibility of the decorative plate and the decorative sheet can be improved.

The slurry may additionally contain an inorganic filler other than endothermic metal hydroxide, a silane coupling agent, a flame retardant, and the like.

Examples of the inorganic filler include carbonates such as calcium carbonates, magnesium carbonates, and zinc carbonates, silica, talc, and fly ash. The average particle diameter of the inorganic filler may be in the range of, for example, 0.05 to 20 μm. In a case where the average particle diameter of the inorganic filler is in this range, the impregnation properties of the slurry into the fiber base material are further improved. The average particle diameter of the inorganic filler is an arithmetic average diameter calculated from the particle size distribution (volume distribution) detected by the laser beam diffraction/scattering method (Microtrac method).

Among the inorganic fillers, carbonate is particularly preferable, and calcium carbonate is furthermore preferable. Use of calcium carbonate further improves workability and machinability of the decorative plate in the production process. Heavy calcium carbonate and light calcium carbonate (precipitated calcium carbonate), for example, may be used as calcium carbonate. The average particle diameter of calcium carbonate may be, for example, 0.05 to 10 μm, and more preferably 0.1 to 5 μm. The average particle diameter of calcium carbonate being 0.05 μm or more causes less agglomeration of calcium carbonate in the slurry, thus improving the impregnation properties of the slurry into the fiber base material. The average particle diameter of calcium carbonate being 10 μm or less provides the decorative plate and the decorative sheet with a smoother surface, thus improving their appearances.

Light calcium carbonate means calcium carbonate chemically produced by calcining limestone. Heavy calcium carbonate means pulverized calcium carbonate produced by dry or wet grinding white crystalline limestone.

The blending ratio of endothermic metal hydroxide in the total inorganic filler contained in the prepreg may be, for example, 30 to 100% by mass. The blending ratio being within this range further improves the non-combustibility and the machinability of the decorative plate and the decorative sheet.

The slurry may contain, for example, a silane coupling agent. The slurry containing a silane coupling agent provides a lower weight increase rate and a further improved close adhesion between the prepreg and the balancing layer, as compared with a slurry containing no silane coupling agent, in terms of boiling resistance in accordance with JIS K-6902 "Testing method for laminated thermosetting high-pressure decorative sheets". The blending ratio of the silane coupling agent in the total slurry content is preferably in the range of 0.1 to 10% by weight in solid equivalent.

Examples of the silane coupling agent include (meth) acryloyloxy group-containing silane such as 3-(meth)acryloyloxypropyl trimethoxysilane and 3-(meth)acryloyloxypropyl triethoxysilane; vinyl group-containing silane such as vinyl trimethoxysilane and vinyl triethoxysilane; epoxy group-containing silane such as 3-glycidoxypropyl trimethoxysilane, 3-glycidoxypropyl methyl dimethoxysilane, and 3-glycidoxypropyl triethoxysilane; styryl group-containing silane such as p-styryl trimethoxysilane; amino group-containing silane such as 3-aminopropyl trimethoxysilane, 3-aminopropyl triethoxysilane, 3-(2-aminoethyl) aminopropyl trimethoxysilane, and 3-phenyl aminopropyl trimethoxysilane; and mercapto group-containing silane such as 3-mercaptopropyl trimethoxysilane, 3-mercaptopropyl triethoxysilane, and 3-mercaptopropyl methyl dimethoxysilane. In particular, use of epoxy group-containing silane or amino group-containing silane further improves the cross-linking density of the prepreg.

The amount of the silane coupling agent contained in the core layer (the weight of the silane coupling agent contained in the core layer per unit area) is preferably in the range of 1-15 $g/m^2$. The amount of the silane coupling agent being within this range makes the above-described effect of the silane coupling agent further prominent.

The core layer may contain, for example, a flame retardant. As the flame retardant, a phosphorus flame retardant, a nitrogen flame retardant, a phosphorus-nitrogen flame retardant can be preferably used. Examples of the phosphorus flame retardant include an ester phosphate, a phosphorus-containing polyol, and a phosphorus-containing amine. Examples of the nitrogen flame retardant include a melamine cyanurate, a triazine compound, and a guanidine compound.

The phosphorus-nitrogen flame retardant is a compound having the functions of both the phosphorus flame retardant and the nitrogen flame retardant and contains both phosphorus atoms and nitrogen atoms in a single molecule. When the phosphorus-nitrogen flame retardant is exposed to high temperature, phosphorus blocks oxygen by its strong dehydrating action and nitrogen produces ammonia gas and the like to block oxygen. Because of these actions, the phosphorus-nitrogen flame retardant improves heat-insulating and flame-retardant effects, which makes the prepreg less inflammable. The ratio of the total nitrogen content in the flame retardant is preferably 1 to 50% by mass. The blending ratio of the flame retardant in the slurry is preferably in the range of 0.1 to 15% by mass in solid equivalent.

The amount of the flame retardant contained in the core layer (the weight of the flame retardant contained in the core layer per unit area) is preferably in the range of 1 to 100 $g/m^2$. The amount of the flame retardant being within this range makes the above-described effect of the flame retardant further prominent.

When the fiber base material is impregnated with the slurry, it is preferable that the fiber base material is impregnated such that the impregnation rate defined by Formula 1 falls in the range of 500 to 1200%, and then the impregnated fiber base material is dried. The impregnation rate of 1200% or less can suppress fall-off of the solid content of the slurry from the prepreg and thus makes the prepreg easy to handle. The impregnation rate of 500% or more causes less separation between the layers of the prepreg.

3. Balancing Layer

The balancing layer is a part of the decorative plate and is made of mixed paper containing endothermic metal hydroxide as the base material. The balancing layer is, for example, thermosetting-resin-impregnated paper made by impregnating the base material with the resin liquid composed mainly of the thermosetting resin and drying the impregnated base material. The balancing layer is well balanced and thus can further suppress curling of the decorative sheet. Moreover, since the balance layer includes the mixed paper containing endothermic metal hydroxide as the base material, fire resistance of the decorative sheet is improved.

Examples of the thermosetting resin include an amino-formaldehyde resin, a phenol-aldehyde resin, and a vinyl ester resin. The amino-formaldehyde resin can be obtained by condensation between an amino compound, such as melamine, urea, acetoguanamine, benzoguanamine and the like, and formaldehyde. From a perspective of improving the bending workability of the decorative sheet, the vinyl ester resin is particularly preferable.

The phenol-aldehyde resin can be obtained by a reaction of phenols and aldehydes under a basic catalyst in the ratio of 1 mol of phenolic hydroxyl group to 1 to 1.3 mol of aldehydes. Examples of the phenols include phenol, cresol, xylenol, octylphenol, phenylphenol, bisphenol A, bisphenol S, and bisphenol F. Examples of the aldehydes include formaldehyde, paraformaldehyde, and glyoxal.

The phenol-aldehyde resin may be, as required, a denatured phenol-aldehyde resin, which has been denatured with a denaturant that facilitates plasticization, such as para-sulfonamide, tung oil, phosphoric acid esters, or glycols.

Examples of the basic catalyst include alkali metal oxide, alkali metal hydroxide, alkali earth oxide, and alkali earth hydroxide. Examples of alkaline metal include sodium and potassium. Examples of alkali earth include magnesium and calcium. Examples of other basic catalysts include amines such as triethylamine and triethanolamine, and ammonia.

The vinyl ester resin can be obtained by a reaction of an epoxy resin and unsaturated monobasic acid with an esterification catalyst. Examples of the epoxy resin include a bisphenol A epoxy resin, a halogenated bisphenol A epoxy resin, a diglycidyl ether that is an adduct of bisphenol A and alkylene oxide, a bisphenol F epoxy resin, a novolac epoxy resin, a cresol novolac epoxy resin. Examples of alkylene oxide include ethylene oxide and propylene oxide.

Examples of unsaturated monobasic acid include acrylic acid, methacrylic acid, crotonic acid, monomethyl maleate, monopropyl maleate, sorbic acid, and mono(2-ethylhexyl) maleate. Examples of polybasic acid used with unsaturated monobasic acid include succinic acid, maleic acid, fumaric acid, itaconic acid, phthalic acid, isophthalic acid, terephthalic acid, adipic acid, azelaic acid, and 1,12-dodecanedioic acid in addition to dimer acid.

Examples of the esterification catalyst include tertiary amines such as dimethylbenzylamine and tributylamine; quaternary ammonium salt such as trimethylbenzylammonium chloride; inorganic salt such as lithium chloride and chromium chloride; imidazole compound such as 2-ethyl-4-methylimidazole; phosphonium salt such as tetramethyl phosphonium chloride, diethylphenylpropylphosphonium chloride, triethylphenylphosphonium chloride, benzyltriethylphenylphosphonium chloride, dibenzylethylmethylphosphonium chloride, benzylmethyldiphenylphosphonium chloride, tetraphenylphosphonium bromide; secondary amines; tetrabutylurea; triphenylphosphine; tritolylphosphine; triphenylstibine.

The impregnation rate of the thermosetting resin in the balancing layer defined by Formula 1 is preferably 5 to 50%. The amount of the thermosetting resin contained in the balancing layer (in solid equivalent) may be 5.5 to 55 $g/m^2$. In a case where one of the impregnation rate or the amount of the thermosetting resin is in the corresponding aforementioned range, curling of the decorative sheet can be further suppressed, and the flexibility of the decorative sheet and the close adhesion between the decorative layer and the core layer can be further improved, and reduction in the total heat release of the decorative plate.

Examples of the mixed paper containing endothermic metal hydroxide include mixed paper that is formed from a slurry containing pulp and endothermic metal hydroxide by dehydration and drying of the paper. This mixed paper has a self-extinguishing characteristic and thus can inhibit flame from spreading.

To the aforementioned slurry, an aggregate binder, a chemical agent, organic fibers, inorganic fibers, and a fixing agent, for example, may be added in addition to the pulp and endothermic metal hydroxide. As a papermaking machine used for making the paper, a cylinder paper machine, a multi-cylinder Fourdrinier paper machine, a Fourdrinier-cylinder combination paper machine, an inclined paper machine, for example, may be used. The basis weight of the mixed paper is, for example, 60 to 200 $g/m^2$.

Examples of the pulp include natural pulp such as wood pulp, cotton pulp, plant fiber pulp. In particular, use of chemical pulp made by chemically treating wood pulp, such as broad-leaved tree bleached kraft pulp, needle-leaved tree kraft pulp, and the like having a short fiber length is preferable so as to improve the paper strength and the impregnation properties of the mixed paper. Broad-leaved tree bleached kraft pulp and needle-leaved tree kraft pulp may be used together. The pulp may be bleached or non-bleached.

Examples of endothermic metal hydroxide include aluminum hydroxide, magnesium hydroxide, and calcium hydroxide, among which aluminum hydroxide is particularly preferably used. The ratio of endothermic metal hydroxide relative to the total amount of endothermic metal hydroxide and the pulp (hereinafter referred to as the mixing ratio) is preferably 40 to 95% by mass and more preferably 55 to 85% by mass. With the mixing ratio of 40% by mass or more, the non-combustibility of the mixed paper is further increased. With the mixing ratio of 95% by mass or less, the paper strength of the mixed paper is further increased.

4. Adhesive Layer

The adhesive layer in combination with the decorative plate forms the decorative sheet. The adhesive layer is disposed on one side of the decorative plate.

The adhesive layer may comprise, for example, an adhesive and release paper. Examples of the adhesive include an acrylic adhesive containing acrylic polymers and a tackifier, and a solvent rubber-based adhesive containing styrene-butadiene.

Examples of monomers forming the acrylic polymers contained in the acrylic adhesive include (meth)acrylic acid alkyl ester such as (meth)methyl acrylate, (meth)ethyl acrylate, (meth)n-propyl acrylate, and (meth)butyl acrylate. (Meth)acrylic acid means methacrylic acid or acrylic acid. Examples of the tackifier include a rosin-based tackifier, a terpene-based tackifier, a phenol-based tackifier, and a coumarone-based tackifier. As the release paper, known release paper with a silicone release agent being applied thereon is used, for example. The thickness of the adhesive layer is preferably 50 to 180 μm. Within this range of the thickness of the adhesive layer, the adhesive strength of the adhesive is further increased.

5. Method for Producing Decorative Sheet

The decorative sheet according to the present disclosure can be produced by, for example, producing the decorative plate and then laminating and pressing the adhesive layer on the surface in the opposite side of the decorative plate from the decorative layer. The method for producing the decorative plate may comprise, for example, stacking the decorative layer, the balancing layer, and the core layer and heating and pressing the decorative plate with a press machine, such as a flat press machine or a continuous press machine.

6. Layer Structure of Decorative Sheet

The layer structure of the decorative sheet may be, for example, as shown in FIG. 1. A decorative sheet 1 comprises a decorative plate 3 and an adhesive layer 5. The adhesive layer 5 is disposed on one side (first side) 3A of the decorative plate 3.

The decorative plate 3 comprises a decorative layer 7, a core layer 9, and a balancing layer 11. The decorative layer 7 is disposed on an opposite side (second side) 3B of the decorative plate 3 from the side 3A. The core layer 9 is located on the side 3A of the decorative plate 3. The balancing layer 11 is disposed between the decorative layer 7 and the core layer 9. In the stacking structure shown in FIG. 1, the formation of the core layer 9 is less likely to appear on the surface in the opposite side 3B of the decorative plate 3, which results in a further improvement in the smoothness of the decorative plate 3.

The decorative plate 3 may further comprise other layer(s). The position(s) of the other layer(s) may be, for example, between the decorative layer 7 and the balancing layer 11, between the balancing layer 11 and the core layer 9, and/or on the surface in the side 3A.

Figure 2:
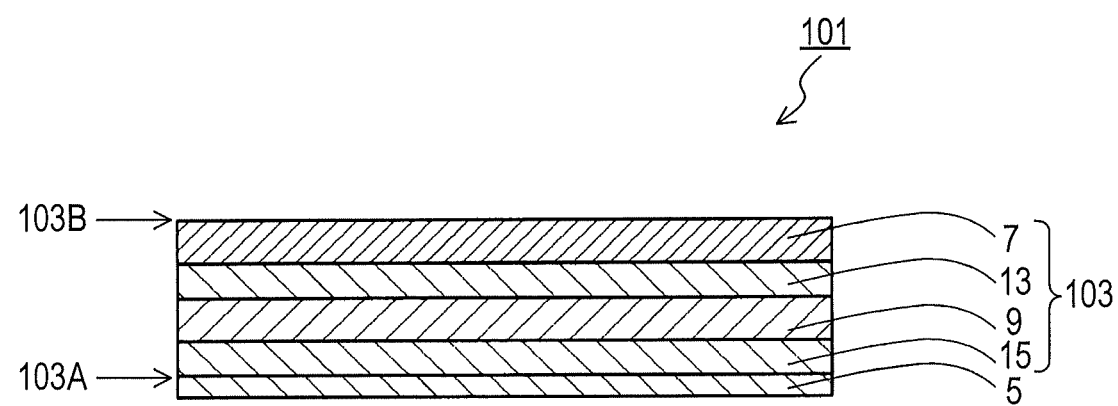
FIG. 2 is a sectional side elevation view showing a structure of a decorative sheet 10.

The layer structure of the decorative sheet may be, for example, the structure shown in FIG. 2. The decorative sheet 101 comprises a decorative plate 103 and the adhesive layer 5. The adhesive layer 5 is disposed on one side 103A of the decorative plate 103.

The decorative plate 103 comprises the decorative layer 7, a first balancing layer 13, the core layer 9, and a second balancing layer 15. The first balancing layer 13 and the second balancing layer 15 correspond to the balancing layer. The decorative layer 7 is disposed on an opposite side 103B of the decorative plate 103 from the side 103A. The first balancing layer 13 is located between the core layer 9 and the decorative layer 7. The second balancing layer 15 is located between the core layer 9 and the adhesive layer 5. In the stacking structure shown in FIG. 2, the handleability of the decorative sheet 101 is improved, and thus less damage is caused while the decorative sheet 101 is handled.

The decorative plate 103 may further comprise other layer(s). The position(s) of the other layer(s) may be, for example, between the decorative layer 7 and the first balancing layer 13, between the first balancing layer 13 and the core layer 9, between the core layer 9 and the second balancing layer 15, and/or on the surface in the side 103A.

Figure 3:
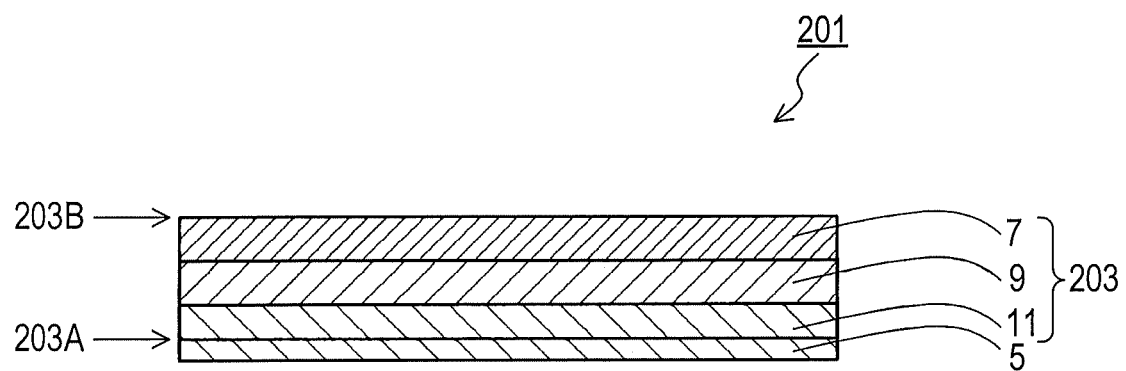
FIG. 3 is a sectional side elevation view showing a structure of a decorative sheet 201.

The layer structure of the decorative sheet may be, for example, the structure shown in FIG. 3. A decorative sheet 201 comprises a decorative plate 203 and the adhesive layer 5. The adhesive layer 5 is arranged on one side 203A of the decorative plate 203.

The decorative plate 203 comprises the decorative layer 7, the core layer 9, and the balancing layer 11. The decorative layer 7 is disposed on an opposite side 203B of the decorative plate 203 from the side 203A. The balancing layer 11 is located on the side 203A of the decorative plate 203. The core layer 9 is located between the decorative layer 7 and the balancing layer 11.

The decorative plate 203 may further comprise other layer(s). The position(s) of the other layer(s) may be, for example, between the decorative layer 7 and the core layer 9, between the core layer 9 and the balancing layer 11, and/or on the surface in the side 203A.

7. Thickness of Decorative Sheet

The thickness of the decorative sheet is preferably 0.3 to 2.0 mm. Within this range of the thickness, curling of the decorative sheet can be further suppressed. In particular, in a case where the thickness of the decorative sheet is 0.3 to 0.8 mm, the decorative sheet excels in bending workability under normal temperature. The present disclosure will be described in a detailed manner hereinafter in embodiments and comparative examples.

Embodiment 1

(1) Production of Decorative Layer

Grain-pattern-printed decorative paper having the basis weight of 100 g/m² is impregnated with resin liquid composed mainly of the melamine-formaldehyde resin such that the impregnation rate defined in Formula 1 becomes 130% and is dried so as to produce patterned paper impregnated with the melamine resin. This patterned paper impregnated with the melamine resin was used as the decorative layer.

(2) Production of Core Layer

The following components were mixed to produce the slurry. The values of the components by weight show values in solid equivalent.

acrylic resin emulsion: 32 parts by mass
aluminum hydroxide: 300 parts by mass
3-glycidoxypropyl trimethoxysilane: 2.7 parts by mass
guanidine phosphate: 29 parts by mass
water: appropriate amount The acrylic resin emulsion serves as the binder. The acrylic resin emulsion is Product No. RAX-208 manufactured by Aica Kogyo Co., Ltd. The glass transition temperature (Tg) of the acrylic resin emulsion is 60° C. The acrylic resin emulsion contains 2-ethylhexyl acrylate and methyl methacrylate as the main monomers. The average particle diameter of the acrylic resin emulsion is 200 nm.

Aluminum hydroxide serves as endothermic metal hydroxide. The average particle diameter of aluminum hydroxide is 8 μm. 3-Glycidoxypropyl trimethoxysilane is the silane coupling agent. Guanidine phosphate serves as the flame retardant. Guanidine phosphate is APINON 303 manufactured by Sanwa Chemical Co., Ltd. and accounts for 39% of the total nitrogen content.

The composition of the slurry is shown in Table 1. Table 1 also shows the compositions of the slurries in Embodiments 2 to 27 and Comparative Examples 1 to 4, which will be described later.

TABLE 1

| | Composition of slurry in core layer [parts by mass] | | | | | |
|---|---|---|---|---|---|---|
| | Acrylic resin emulsion | Aluminum hydroxide | Calcium carbonate | Silane coupling agent | Flame retardant | Total solid content |
| Embodiment 1 | 32 | 300 | 0 | 2.7 | 29 | 363.7 |
| Embodiment 2 | 32 | 300 | 0 | 2.7 | 29 | 363.7 |
| Embodiment 3 | 32 | 300 | 0 | 2.7 | 29 | 363.7 |
| Embodiment 4 | 32 | 300 | 0 | 2.7 | 29 | 363.7 |
| Embodiment 5 | 32 | 300 | 0 | 2.7 | 29 | 363.7 |
| Embodiment 6 | 32 | 300 | 0 | 2.7 | 29 | 363.7 |
| Embodiment 7 | 17 | 300 | 0 | 2.7 | 29 | 348.7 |
| Embodiment 8 | 58 | 300 | 0 | 2.7 | 29 | 389.7 |
| Embodiment 9 | 32 | 300 | 0 | 2.7 | 29 | 363.7 |
| Embodiment 10 | 32 | 300 | 0 | 2.7 | 29 | 363.7 |
| Embodiment 11 | 32 | 600 | 0 | 2.7 | 29 | 663.7 |
| Embodiment 12 | 32 | 100 | 100 | 2.7 | 29 | 263.7 |
| Embodiment 13 | 32 | 300 | 0 | 1.8 | 29 | 362.8 |
| Embodiment 14 | 32 | 300 | 0 | 3.5 | 29 | 364.5 |
| Embodiment 15 | 32 | 300 | 0 | 18 | 29 | 379 |
| Embodiment 16 | 32 | 300 | 0 | 2.7 | 3.5 | 338.2 |
| Embodiment 17 | 32 | 300 | 0 | 2.7 | 35 | 369.7 |
| Embodiment 18 | 32 | 300 | 0 | 2.7 | 29 | 363.7 |
| Embodiment 19 | 32 | 300 | 0 | 2.7 | 29 | 363.7 |
| Embodiment 20 | 32 | 300 | 0 | 2.7 | 29 | 363.7 |
| Embodiment 21 | 32 | 300 | 0 | 2.7 | 29 | 363.7 |
| Embodiment 22 | 32 | 300 | 0 | 2.7 | 29 | 363.7 |
| Embodiment 23 | 32 | 300 | 0 | 2.7 | 29 | 363.7 |
| Embodiment 24 | 32 | 300 | 0 | 2.7 | 29 | 363.7 |
| Embodiment 25 | 32 | 300 | 0 | 2.7 | 29 | 363.7 |
| Embodiment 26 | 32 | 300 | 0 | 2.7 | 29 | 363.7 |
| Embodiment 27 | 32 | 300 | 0 | 2.7 | 29 | 363.7 |
| Comparative Example 1 | 32 | 300 | 0 | 2.7 | 29 | 363.7 |
| Comparative Example 2 | — | — | — | — | — | — |

TABLE 1-continued

| | Composition of slurry in core layer [parts by mass] | | | | | |
|---|---|---|---|---|---|---|
| | Acrylic resin emulsion | Aluminum hydroxide | Calcium carbonate | Silane coupling agent | Flame retardant | Total solid content |
| Comparative Example 3 | 32 | 300 | 0 | 2.7 | 29 | 363.7 |
| Comparative Example 4 | 32 | 300 | 0 | 2.7 | 29 | 363.7 |

A prepreg having a glass-fiber-fabric base material was produced by impregnating a glass fiber nonwoven fabric having the basis weight of 35 g/m² with the aforementioned slurry such that the impregnation rate defined by Formula 1 became 850% and drying the impregnated the fabric. The glass fiber nonwoven fabric corresponds to the fiber base material. The prepreg having the glass-fiber-fabric base material produced as described above was used as the core layer.

The amount of each of the compositions contained in the core layer is shown in Table 2. Table 2 also shows the amount of each of the compositions contained in Embodiments 2 to 27 and Comparative Examples 1 to 4, which will be described later.

TABLE 2

| | Amount of each contained component [g/m²] | | | | |
|---|---|---|---|---|---|
| | Acrylic resin emulsion | Aluminum hydroxide | Calcium carbonate | Silane coupling agent | Flame retardant |
| Embodiment 1 | 29.3 | 274.3 | 0.0 | 2.5 | 26.5 |
| Embodiment 2 | 29.3 | 274.3 | 0.0 | 2.5 | 26.5 |
| Embodiment 3 | 29.3 | 274.3 | 0.0 | 2.5 | 26.5 |
| Embodiment 4 | 29.3 | 274.3 | 0.0 | 2.5 | 26.5 |
| Embodiment 5 | 29.3 | 274.3 | 0.0 | 2.5 | 26.5 |
| Embodiment 6 | 29.3 | 274.3 | 0.0 | 2.5 | 26.5 |
| Embodiment 7 | 16.2 | 286.1 | 0.0 | 2.6 | 27.7 |
| Embodiment 8 | 49.5 | 256.0 | 0.0 | 2.3 | 24.7 |
| Embodiment 9 | 29.3 | 274.3 | 0.0 | 2.5 | 26.5 |
| Embodiment 10 | 29.3 | 274.3 | 0.0 | 2.5 | 26.5 |
| Embodiment 11 | 16.0 | 300.6 | 0.0 | 1.4 | 14.5 |
| Embodiment 12 | 40.3 | 126.1 | 126.1 | 3.4 | 36.6 |
| Embodiment 13 | 29.3 | 274.9 | 0.0 | 1.6 | 26.6 |
| Embodiment 14 | 29.2 | 273.7 | 0.0 | 3.2 | 26.5 |
| Embodiment 15 | 28.1 | 263.2 | 0.0 | 15.8 | 25.4 |
| Embodiment 16 | 31.5 | 294.9 | 0.0 | 2.7 | 3.4 |
| Embodiment 17 | 28.8 | 269.8 | 0.0 | 2.4 | 31.5 |
| Embodiment 18 | 29.3 | 274.3 | 0.0 | 2.5 | 26.5 |
| Embodiment 19 | 29.3 | 274.3 | 0.0 | 2.5 | 26.5 |
| Embodiment 20 | 29.3 | 274.3 | 0.0 | 2.5 | 26.5 |
| Embodiment 21 | 29.3 | 274.3 | 0.0 | 2.5 | 26.5 |
| Embodiment 22 | 29.3 | 274.3 | 0.0 | 2.5 | 26.5 |
| Embodiment 23 | 29.3 | 274.3 | 0.0 | 2.5 | 26.5 |
| Embodiment 24 | 29.3 | 274.3 | 0.0 | 2.5 | 26.5 |
| Embodiment 25 | 29.3 | 274.3 | 0.0 | 2.5 | 26.5 |
| Embodiment 26 | 29.3 | 274.3 | 0.0 | 2.5 | 26.5 |
| Embodiment 27 | 29.3 | 274.3 | 0.0 | 2.5 | 26.5 |
| Comparative Example 1 | 29.3 | 274.3 | 0.0 | 2.5 | 26.5 |
| Comparative Example 2 | — | — | — | — | — |
| Comparative Example 3 | 29.3 | 274.3 | 0.0 | 2.5 | 26.5 |
| Comparative Example 4 | 29.3 | 274.3 | 0.0 | 2.5 | 26.5 |

(3) Production of Balancing Layer

Aluminum hydroxide mixed paper (Product name: Sanwall, manufactured by Sanzen Paper Manufacturing Co., Ltd., the mixing ratio of aluminum hydroxide 69% by mass) having the basis weight of 110 g/m² was impregnated with resin liquid composed mainly of the vinyl ester resin having bisphenol vinyl ester as the main skeleton such that the impregnation rate defined by Formula 1 became 15% and was dried so as to produce mixed paper impregnated with the vinyl ester resin. This mixed paper impregnated with the vinyl ester resin was used as the balancing layer.

The composition of the resin liquid composed mainly of the vinyl ester resin is as follows.
  bisphenol vinyl ester: 61 to 65% by mass
  methacryl monomer: 13 to 17% by mass
  propylene glycol monomethyl ether acetate: 20% by mass
  acrylic acid: 2% by mass The aluminum hydroxide mixed paper serves as the base material. The propylene glycol monomethyl ether acetate serves as a diluent.

The details of the balancing layer are shown in Table 3. Table 3 also shows the details of the balancing layers in Embodiments 2 to 27 and Comparative Examples 1 to 4, which will be described later.

TABLE 3

| | Balancing layer | | | | |
|---|---|---|---|---|---|
| | Base material | Mixed ratio (% by mass) | Basis weight (g/m²) | Impregnating resin | Impregnation rate (% by mass) | Impregnation amount (g/m²) |
| Embodiment 1 | Al mixed paper | 69 | 110 | Vinyl ester | 15 | 16.5 |
| Embodiment 2 | Al mixed paper | 69 | 110 | Vinyl ester | 15 | 16.5 |
| Embodiment 3 | Al mixed paper | 69 | 110 | Vinyl ester | 15 | 16.5 |
| Embodiment 4 | Al mixed paper | 69 | 110 | Vinyl ester | 15 | 16.5 |
| Embodiment 5 | Al mixed paper | 69 | 110 | Vinyl ester | 15 | 16.5 |
| Embodiment 6 | Al mixed paper | 69 | 110 | Vinyl ester | 15 | 16.5 |
| Embodiment 7 | Al mixed paper | 69 | 110 | Vinyl ester | 15 | 16.5 |

TABLE 3-continued

|  | | Balancing layer | | | | |
|---|---|---|---|---|---|---|
|  | Base material | Mixed ratio (% by mass) | Basis weight (g/m²) | Impregnating resin | Impregnation rate (% by mass) | Impregnation amount (g/m²) |
| Embodiment 8 | Al mixed paper | 69 | 110 | Vinyl ester | 15 | 16.5 |
| Embodiment 9 | Al mixed paper | 69 | 110 | Vinyl ester | 15 | 16.5 |
| Embodiment 10 | Al mixed paper | 69 | 110 | Vinyl ester | 15 | 16.5 |
| Embodiment 11 | Al mixed paper | 69 | 110 | Vinyl ester | 15 | 16.5 |
| Embodiment 12 | Al mixed paper | 69 | 110 | Vinyl ester | 15 | 16.5 |
| Embodiment 13 | Al mixed paper | 69 | 110 | Vinyl ester | 15 | 16.5 |
| Embodiment 14 | Al mixed paper | 69 | 110 | Vinyl ester | 15 | 16.5 |
| Embodiment 15 | Al mixed paper | 69 | 110 | Vinyl ester | 15 | 16.5 |
| Embodiment 16 | Al mixed paper | 69 | 110 | Vinyl ester | 15 | 16.5 |
| Embodiment 17 | Al mixed paper | 69 | 110 | Vinyl ester | 15 | 16.5 |
| Embodiment 18 | Al mixed paper | 69 | 110 | Vinyl ester | 15 | 16.5 |
| Embodiment 19 | Al mixed paper | 69 | 110 | Vinyl ester | 15 | 16.5 |
| Embodiment 20 | Al mixed paper | 69 | 110 | Vinyl ester | 5 | 5.5 |
| Embodiment 21 | Al mixed paper | 69 | 110 | Vinyl ester | 50 | 55 |
| Embodiment 22 | Al mixed paper | 69 | 180 | Vinyl ester | 15 | 27 |
| Embodiment 23 | Al mixed paper | 69 | 80 | Vinyl ester | 15 | 12 |
| Embodiment 24 | Al mixed paper | 60 | 110 | Vinyl ester | 15 | 16.5 |
| Embodiment 25 | Al mixed paper | 80 | 110 | Vinyl ester | 15 | 16.5 |
| Embodiment 26 | Al mixed paper | 85 | 110 | Melamine | 15 | 16.5 |
| Embodiment 27 | Al mixed paper | 85 | 110 | Phenol | 15 | 16.5 |
| Comparative Example 1 | — | — | — | — | — | — |
| Comparative Example 2 | — | — | — | — | — | — |
| Comparative Example 3 | Kraft paper | — | 180 | Vinyl ester | 15 | 27 |
| Comparative Example 4 | Kraft paper | — | 110 | Vinyl ester | 15 | 16.5 |

"Al mixed paper" in Table 3 means the aluminum hydroxide mixed paper. "Basis weight" in Table 3 means the basis weight of the base material. "Impregnated resin" in Table 3 means the type of the resin impregnated in the base material. "Impregnation amount" in Table 3 means the amount of the resin impregnated in the balancing layer per unit area.

(4) Production of Decorative Sheet

As shown in FIG. 1, the core layer 9, the balancing layer 11, and the decorative layer 7 were stacked in this order. The core layer 9 is made of a sheet of the prepreg having the glass-fiber-fabric base material. The balancing layer 11 is made of a sheet of vinyl-ester-resin-impregnated mixed paper. The decorative layer 7 is made of a sheet of the patterned paper impregnated with the melamine resin.

Subsequently, heat and pressure were applied to the stack of the core layer 9, the balancing layer 11, and the decorative layer 7 with a flat press machine under the conditions of temperature 132° C., pressure 70 kgf/cm², and molding time 64 minutes so as to form the decorative plate 3 with a thickness of 0.43 mm.

Then, on the side 3A of the decorative plate 3, an acrylic adhesive sheet (manufactured by Nichiei Kakoh Co., Ltd.) was stuck so as to form the decorative sheet 1. The acrylic adhesive sheet corresponds to the adhesive layer 5. The acrylic adhesive sheet was made by applying the acrylic adhesive composed mainly of the acrylic resin on the silicone release paper and had a thickness of 136 μm.

The layer structure in Embodiment 1 is shown in Table 4. Table 4 also shows the layer structures in Embodiments 2 to 27 and Comparative Examples 1 to 4, which will be described later.

TABLE 4

| | Layer Structure of Decorative Board | | | |
|---|---|---|---|---|
| Embodiment 1 | Decorative layer | Balancing layer | Core layer | — |
| Embodiment 2 | Decorative layer | Balancing layer | Core layer | — |
| Embodiment 3 | Decorative layer | Balancing layer | Core layer | — |
| Embodiment 4 | Decorative layer | Balancing layer | Core layer | — |
| Embodiment 5 | Decorative layer | Core layer | Balancing layer | — |
| Embodiment 6 | Decorative layer | Balancing layer | Core layer | Balancing layer |
| Embodiment 7 | Decorative layer | Balancing layer | Core layer | — |
| Embodiment 8 | Decorative layer | Balancing layer | Core layer | — |
| Embodiment 9 | Decorative layer | Balancing layer | Core layer | — |
| Embodiment 10 | Decorative layer | Balancing layer | Core layer | — |
| Embodiment 11 | Decorative layer | Balancing layer | Core layer | — |
| Embodiment 12 | Decorative layer | Balancing layer | Core layer | — |
| Embodiment 13 | Decorative layer | Balancing layer | Core layer | — |
| Embodiment 14 | Decorative layer | Balancing layer | Core layer | — |
| Embodiment 15 | Decorative layer | Balancing layer | Core layer | — |
| Embodiment 16 | Decorative layer | Balancing layer | Core layer | — |
| Embodiment 17 | Decorative layer | Balancing layer | Core layer | — |
| Embodiment 18 | Decorative layer | Balancing layer | Core layer | — |
| Embodiment 19 | Decorative layer | Balancing layer | Core layer | — |

TABLE 4-continued

| | Layer Structure of Decorative Board | | | |
|---|---|---|---|---|
| Embodiment 20 | Decorative layer | Balancing layer | Core layer | — |
| Embodiment 21 | Decorative layer | Balancing layer | Core layer | — |
| Embodiment 22 | Decorative layer | Balancing layer | Core layer | — |
| Embodiment 23 | Decorative layer | Balancing layer | Core layer | — |
| Embodiment 24 | Decorative layer | Balancing layer | Core layer | — |
| Embodiment 25 | Decorative layer | Balancing layer | Core layer | — |
| Embodiment 26 | Decorative layer | Balancing layer | Core layer | — |
| Embodiment 27 | Decorative layer | Balancing layer | Core layer | — |
| Comparative Example 1 | Decorative layer | Core layer | — | — |
| Comparative Example 2 | Decorative layer | Ph Core paper | Ph Core paper | — |
| Comparative Example 3 | Decorative layer | Balancing layer | Core layer | — |
| Comparative Example 4 | Decorative layer | Balancing layer | Core layer | — |

The description in Table 4 means that the layers forming the decorative plate are stacked in the described order. "Ph Core paper" in Table 4 means the core paper impregnated with the phenol resin.

The details of the adhesive layer in Embodiment 1 are shown in Table 5. Table 5 also shows the details of the adhesive layers in Embodiments 2 to 27 and Comparative Examples 1 to 4, which will be described later.

TABLE 5

| | Adhesive layer | |
|---|---|---|
| | Type | Total adhesive thickness (μm) |
| Embodiment 1 | Acrylic | 136 |
| Embodiment 2 | Acrylic | 80 |
| Embodiment 3 | Acrylic | 50 |
| Embodiment 4 | Solvent rubber | 140 |
| Embodiment 5 | Acrylic | 136 |
| Embodiment 6 | Acrylic | 136 |
| Embodiment 7 | Acrylic | 136 |
| Embodiment 8 | Acrylic | 136 |
| Embodiment 9 | Acrylic | 136 |
| Embodiment 10 | Acrylic | 136 |
| Embodiment 11 | Acrylic | 136 |
| Embodiment 12 | Acrylic | 136 |
| Embodiment 13 | Acrylic | 136 |
| Embodiment 14 | Acrylic | 136 |
| Embodiment 15 | Acrylic | 136 |
| Embodiment 16 | Acrylic | 136 |
| Embodiment 17 | Acrylic | 136 |
| Embodiment 18 | Acrylic | 136 |
| Embodiment 19 | Acrylic | 136 |
| Embodiment 20 | Acrylic | 136 |
| Embodiment 21 | Acrylic | 136 |
| Embodiment 22 | Acrylic | 136 |
| Embodiment 23 | Acrylic | 136 |
| Embodiment 24 | Acrylic | 136 |
| Embodiment 25 | Acrylic | 136 |
| Embodiment 26 | Acrylic | 136 |
| Embodiment 27 | Acrylic | 136 |
| Comparative Example 1 | Acrylic | 136 |
| Comparative Example 2 | Acrylic | 136 |
| Comparative Example 3 | Acrylic | 136 |
| Comparative Example 4 | Acrylic | 136 |

"Type" in Table 5 means the type of the resin forming the adhesive layer. "Total adhesive thickness" in Table 5 means the thickness of the adhesive layer.

Embodiment 2

The structure of Embodiment 2 is basically the same as that of Embodiment 1, and thus the difference will be described below. In the above-described Embodiment 1, the acrylic adhesive sheet with a thickness of 136 μm was stuck to the decorative plate. In Embodiment 2, the acrylic adhesive sheet (manufactured by Nichiei Kakoh Co., Ltd.) with a thickness of 80 μm was stuck to the decorative plate.

Embodiment 3

The structure of Embodiment 3 is basically the same as that of Embodiment 1, and thus the difference will be described below. In the above-described Embodiment 1, acrylic adhesive sheet with a thickness of 136 μm was stuck to the decorative plate. In Embodiment 3, the acrylic adhesive sheet (manufactured by Nichiei Kakoh Co., Ltd.) with a thickness of 50 μm was stuck to the decorative plate.

Embodiment 4

The structure of Embodiment 4 is basically the same as that of Embodiment 1, and thus the difference will be described below. In the above-described Embodiment 1, the acrylic adhesive sheet with a thickness of 136 μm was stuck to the decorative plate. In Embodiment 4, the solvent rubber-based adhesive sheet (a styrene-isoprene block copolymer resin) (manufactured by Nichiei Kakoh Co., Ltd.) with a thickness of 140 μm was stuck to the decorative plate.

Embodiment 5

The structure of Embodiment 5 is basically the same as that of Embodiment 1, and thus the difference will be described below. In the above-described Embodiment 1, as shown in FIG. 1, the layers were stacked in the order from the core layer 9, the balancing layer 11, and the decorative layer 7. In Embodiment 5, as shown in FIG. 3, the layers were stacked in the order from the balancing layer 11, the core layer 9, and the decorative layer 7.

Embodiment 6

The structure of Embodiment 6 is basically the same as that of Embodiment 1, and thus the difference will be described below. In the above-described Embodiment 1, as shown in FIG. 1, the layers were stacked in the order from the core layer 9, the balancing layer 11, and the decorative layer 7. In Embodiment 6, as shown in FIG. 2, the layers were stacked in the order from the second balancing layer 15, the core layer 9, the first balancing layer 13, and the decorative layer 7. The second balancing layer 15 and the first balancing layer 13 are similar to the balancing layer 11 in Embodiment 1.

Embodiment 7

The structure of Embodiment 7 is basically the same as that of Embodiment 1, and thus the difference will be described below. In the above-described Embodiment 1, the blended amount of the acrylic resin emulsion in the slurry used for the production of the core layer was 32 parts by mass. In Embodiment 7, the blended amount of the acrylic resin emulsion in the slurry used for the production of the core layer was 17 parts by mass.

Embodiment 8

The structure of Embodiment 8 is basically the same as that of Embodiment 1, and thus the difference will be described below. In the above-described Embodiment 1, the blended amount of the acrylic resin emulsion in the slurry used for the production of the core layer was 32 parts by mass. In Embodiment 8, the blended amount of the acrylic resin emulsion in the slurry used for the production of the core layer was 58 parts by mass.

Embodiment 9

The structure of Embodiment 9 is basically the same as that of Embodiment 1, and thus the difference will be described below. In the above-described Embodiment 1, Product No. RAX-208 manufactured by Aica Kogyo Co., Ltd. was used as the acrylic resin emulsion for the production of the core layer. In Embodiment 9, the acrylic resin emulsion used for the production of the core layer was RAX-208E. RAX-208E is an acrylic resin emulsion manufactured by Aica Kogyo Co., Ltd. The glass transition temperature (Tg) of RAX-208E is 0° C. The main monomers of RAX-208E are 2-ethylhexyl acrylate and methyl methacrylate.

Embodiment 10

The structure of Embodiment 10 is basically the same as that of Embodiment 1, and thus the difference will be described below. In the above-described Embodiment 1, Product No. RAX-208 manufactured by Aica Kogyo Co., Ltd. was used as the acrylic resin emulsion for the production of the core layer. In Embodiment 10, the acrylic resin emulsion used for the production of the core layer was RAX-208D. RAX-208D is an acrylic resin emulsion manufactured by Aica Kogyo Co., Ltd. The glass transition temperature (Tg) of RAX-208D is 30° C. The main monomers of RAX-208D are 2-ethylhexyl acrylate and methyl methacrylate.

Embodiment 11

The structure of Embodiment 11 is basically the same as that of Embodiment 1, and thus the difference will be described below. In the above-described Embodiment 1, the blended amount of aluminum hydroxide in the slurry used for the production of the core layer was 300 parts by mass. In Embodiment 11, the blended amount of aluminum hydroxide in the slurry used for the production of the core layer was 600 parts by mass.

Embodiment 12

The structure of Embodiment 12 is basically the same as that of Embodiment 1, and thus the difference will be described below. In the above-described Embodiment 1, the blended amount of aluminum hydroxide in the slurry used for the production of the core layer was 300 parts by mass. In Embodiment 12, the blended amount of aluminum hydroxide in the slurry used for the production of the core layer was 100 parts by mass. In addition, in Embodiment 12, 100 parts by mass of heavy calcium carbonate with an average particle diameter of 1 μm was further blended in the slurry used for the production of the core layer. Heavy calcium carbonate with an average particle diameter of 1 μm is the inorganic filler other than endothermic metal hydroxide.

Embodiment 13

The structure of Embodiment 13 is basically the same as that of Embodiment 1, and thus the difference will be described below. In the above-described Embodiment 1, the blended amount of 3-glycidoxypropyl trimethoxysilane in the slurry used for the production of the core layer was 2.7 parts by mass. In Embodiment 13, the blended amount of 3-glycidoxypropyl trimethoxysilane in the slurry used for the production of the core layer was 1.8 parts by mass.

Embodiment 14

The structure of Embodiment 14 is basically the same as that of Embodiment 1, and thus the difference will be described below. In the above-described Embodiment 1, the blended amount of 3-glycidoxypropyl trimethoxysilane in the slurry used for the production of the core layer was 2.7 parts by mass. In Embodiment 14, the blended amount of 3-glycidoxypropyl trimethoxysilane in the slurry used for the production of the core layer was 3.5 parts by mass.

Embodiment 15

The structure of Embodiment 15 is basically the same as that of Embodiment 1, and thus the difference will be described below. In the above-described Embodiment 1, the blended amount of 3-glycidoxypropyl trimethoxysilane in the slurry used for the production of the core layer was 2.7 parts by mass. In Embodiment 15, the blended amount of 3-glycidoxypropyl trimethoxysilane in the slurry used for the production of the core layer was 18 parts by mass.

Embodiment 16

The structure of Embodiment 16 is basically the same as that of Embodiment 1, and thus the difference will be described below. In the above-described Embodiment 1, the blended amount of guanidine phosphate in the slurry used for the production of the core layer was 29 parts by mass. In Embodiment 16, the blended amount of guanidine phosphate in the slurry used for the production of the core layer was 3.5 parts by mass.

Embodiment 17

The structure of Embodiment 17 is basically the same as that of Embodiment 1, and thus the difference will be described below. In the above-described Embodiment 1, the blended amount of guanidine phosphate in the slurry used for the production of the core layer was 29 parts by mass. In Embodiment 17, the blended amount of guanidine phosphate in the slurry used for the production of the core layer was 35 parts by mass.

Embodiment 18

The structure of Embodiment 18 is basically the same as that of Embodiment 1, and thus the difference will be described below. In the above-described Embodiment 1, 2.7 parts by mass of 3-glycidoxypropyl trimethoxysilane was blended in the slurry used for the production of the core layer. In Embodiment 18, the same amount of 3-(2-aminoethyl)aminopropyl trimethoxysilane was blended in the slurry used for the production of the core layer instead of 2.7 parts by mass of 3-glycidoxypropyl trimethoxysilane.

Embodiment 19

The structure of Embodiment 19 is basically the same as that of Embodiment 1, and thus the difference will be described below. In the above-described Embodiment 1, 29 parts by mass of guanidine phosphate was blended in the slurry used for the production of the core layer. In Embodiment 19, instead of 29 parts by mass of guanidine phosphate, the same amount of a nitrogen flame retardant was blended in the slurry used for the production of the core layer. The nitrogen flame retardant is Product name of APINON-901 manufactured by Sanwa Chemical Co., Ltd. The nitrogen flame retardant is mainly composed of melamine sulfate and contains 48% of the total nitrogen and 9% of the total sulphur.

Embodiment 20

The structure of Embodiment 20 is basically the same as that of Embodiment 1, and thus the difference will be described below. In the above-described Embodiment 1, the impregnation rate of the vinyl ester resin in the production of the balancing layer was 15%. In Embodiment 20, the impregnation rate of the vinyl ester resin in the production of the balancing layer was 5%.

Embodiment 21

The structure of Embodiment 21 is basically the same as that of Embodiment 1, and thus the difference will be described below. In the above-described Embodiment 1, the impregnation rate of the vinyl ester resin in the production of the balancing layer was 15%. In Embodiment 21, the impregnation rate of the vinyl ester resin in the production of the balancing layer was 50%.

Embodiment 22

The structure of Embodiment 22 is basically the same as that of Embodiment 1, and thus the difference will be described below. In the above-described Embodiment 1, aluminum hydroxide mixed paper having the basis weight of 110 g/m$^2$ is used in the production of the balancing layer. In Embodiment 22, aluminum hydroxide mixed paper having the basis weight of 180 g/m$^2$ was used. This mixed paper is Product name of Sanwall manufactured by Sanzen Paper Manufacturing Co., Ltd. The mixing ratio of aluminum hydroxide in this mixed paper is 69% by mass.

Embodiment 23

The structure of Embodiment 23 is basically the same as that of Embodiment 1, and thus the difference will be described below. In the above-described Embodiment 1, the aluminum hydroxide mixed paper having the basis weight of 110 g/m$^2$ was used in the production of the balancing layer. In Embodiment 23, the aluminum hydroxide mixed paper having the basis weight of 80 g/m$^2$ was used. This mixed paper is manufactured by Awa Paper & Technological Company, Inc. The mixing ratio of aluminum hydroxide in this mixed paper is 69% by mass.

Embodiment 24

The structure of Embodiment 24 is basically the same as that of Embodiment 1, and thus the difference will be described below. In the above-described Embodiment 1, the aluminum hydroxide mixed paper containing aluminum hydroxide in the mixing ratio of 69% by mass was used in the production of the balancing layer. In Embodiment 24, the aluminum hydroxide mixed paper containing aluminum hydroxide in the mixing ratio of 60% by mass was used.

Embodiment 25

The structure of Embodiment 25 is basically the same as that of Embodiment 1, and thus the difference will be described below. In the above-described Embodiment 1, the aluminum hydroxide mixed paper containing aluminum hydroxide in the mixing ratio of 69% by mass was used in the production of the balancing layer. In Embodiment 25, the aluminum hydroxide mixed paper containing aluminum hydroxide in the mixing ratio of 80% by mass was used.

Embodiment 26

The structure of Embodiment 26 is basically the same as that of Embodiment 1, and thus the difference will be described below. In the above-described Embodiment 1, the resin liquid composed mainly of the vinyl ester resin was used in the production of the balancing layer. In Embodiment 26, the aluminum hydroxide mixed paper containing aluminum hydroxide in the mixing ratio of 85% by mass was used, and the resin liquid composed mainly of the melamine resin was used in the production of the balancing layer.

Embodiment 27

The structure of Embodiment 27 is basically the same as that of Embodiment 1, and thus the difference will be described below. In the above-described Embodiment 1, the resin liquid composed mainly of the vinyl ester resin was used in the production of the balancing layer. In Embodiment 27, the aluminum hydroxide mixed paper containing aluminum hydroxide in the mixing ratio of 85% by mass was used, and the resin liquid composed mainly of the phenol resin was used in the production of the balancing layer.

Comparative Example 1

Comparative Example 1 is different from Embodiment 1 in that the decorative plate does not comprise any balancing layer.

Comparative Example 2

The decorative plate was produced by stacking a sheet of melamine-resin-impregnated patterned paper and two sheets of phenol-resin-impregnated core paper that were obtained by impregnating two sheets of Kraft paper with the phenol resin and drying the impregnated sheets of paper. Subsequently, the acrylic adhesive sheet (manufactured by Nichiei Kakoh Co., Ltd.) was stuck on one side of the decorative plate in the same manner as in Embodiment 1 so as to obtain the decorative sheet.

Comparative Example 3

Comparative Example 3 has basically the same structure as that of Embodiment 1. However, as the balancing layer, the vinyl-ester-resin-impregnated Kraft paper having an impregnation rate of 15% was used instead of the vinyl-ester-resin-impregnated mixed paper. This vinyl-ester-resin-impregnated Kraft paper having an impregnation rate of 15% was produced by impregnating Kraft paper having the basis weight of 180 g/m$^2$ with the vinyl ester resin such that the impregnation rate defined by Formula 1 became 15%, and by drying the impregnated Kraft paper.

Comparative Example 4

Comparative Example 4 has basically the same structure as that of Embodiment 1. However, as the balancing layer, the vinyl-ester-resin-impregnated Kraft paper having an impregnation rate of 15% was used instead of the vinyl-ester-resin-impregnated mixed paper. This vinyl-ester-resin-impregnated Kraft paper having the impregnation rate of 15% was produced by impregnating Kraft paper having the basis weight of 110 g/m$^2$ with the vinyl ester resin such that the impregnation rate defined by Formula 1 became 15%, and by drying the impregnated Kraft paper.

<Evaluation of Decorative Plate and Decorative Sheet>

The following evaluations were made regarding the decorative plate and the decorative sheet of each embodiment and each comparative example.

(1) Thickness of Decorative Plate

The thickness of the decorative plate was measured with a micrometer.

(2) Bending Workability of Decorative Plate

A 150 mm wide sample was cut out from the decorative plate. A bar-shaped heater was then placed at a given distance away from the surface of the sample, in which the axial directions of the heater and the fiber direction of the decorative plate were parallel to each other. In this state, the temperature of the heater was set to 700° C. so as to bring the temperature of the surface of the sample to 170° C.

The middle portion of the sample was held such that its sides remained horizontal and then pressed against the upper edge of a vertically arranged plate-shaped fixture from above, in which the fiber direction of the decorative plate and the longitudinal directions of the upper edge of the plate-shaped fixture were maintained parallel to each other. A cross-sectional shape of the upper edge of the fixture is an arc shape having a given radius of curvature.

While the sample was pressed against the fixture as described above, both ends of the sample were pressed further downward to a specific degree so as to bend the sample. Then, the sample was checked whether cracks had been made.

A test to bend the sample as described above was repeated with the radius of curvatures first 12R, then 9R, and finally 6R at the upper edge of the fixture. The minimum radius of curvature that did not cause a crack in the sample was considered as an evaluation value for the bending workability.

(3) Total Heat Release of Decorative Plate

A 20-minute heat release test with a cone calorimeter was carried out on the decorative plates in accordance with ISO5660.

(4) Adhesive Strength of Decorative Sheet

A 300 mm×150 mm piece was cut out from the decorative sheet. The adhesive layer in the cut-out piece and an aluminum plate 2 mm thick were adhered to each other. On the adhered piece, a hand roller weighing 2 kg was reciprocated twice. The piece made in the above process was used as a specimen. The surface of the specimen in the decorative layer side was adhered to a 40 mm×40 mm fixture with a glue (cyanoacrylate).

After curing the above-described specimen for one day under the temperature of 23° C. and the relative humidity of 50%, a force was applied to the specimen in a direction to separate the aluminum plate and the adhesive layer with a glue strength testing device in Building Research Institute Method (manufactured by Oxjack Co., Ltd.) so as to measure the tensile strength. The value of the tensile strength was considered as a measurement value for the adhesive strength.

(5) Bending Workability of Decorative Sheet

A 150 mm wide sample was cut out from the decorative sheet. With the sample, the bending workability of the decorative sheet was measured in the same manner as in the above-described "(2) Bending Workability of Decorative Plate".

(6) Total Heat Release of Decorative Sheet

A 20-minute heat release test with the cone calorimeter was carried out on the decorative sheet in accordance with ISO5660.

(7) Curling of Decorative Sheet

A 50 mm×300 mm sample was cut out from the decorative sheet. The fiber direction of the decorative plate forming the decorative sheet is parallel to the transverse directions of this sample. This sample was cured in an environment with a room temperature of 40° C. and humidity of 30% for 24 hours. The sample was placed on a horizontal surface, and one end of the sample in the longitudinal directions was pressed against the horizontal surface so as to measure the distance between the other end of the sample in the longitudinal directions and the horizontal surface. This distance is referred to as a curve height that reflects the size of the curl of the sample.

(8) Bending Performance of Decorative Sheet at Normal Temperature

A 50 mm×150 mm sample was cut out from the decorative sheet. The fiber direction of the decorative plate forming the decorative sheet is parallel to the transverse directions of this sample. With this sample, the bending workability of the decorative sheet was measured basically in the same manner as in the above-described "(2) Bending Workability of Decorative Plate". However, the temperature of the sample at the measurement was normal temperature.

Evaluation results are shown in Table 6. The unit for R in Table 6 is in mm.

TABLE 6

| | Evaluation of decorative plate | | | Adhesive strength (N/cm²) | Evaluation of decorative sheet | | | |
|---|---|---|---|---|---|---|---|---|
| | Thickness (mm) | Bending workability | Total heat release | | Bending workability | Total heat release | Curl (mm) | Bending performance under normal temperature |
| Embodiment 1 | 0.45 | 6R | 3.1 | 64.4 | 6R | 6.1 | 9 | 15R |
| Embodiment 2 | 0.45 | 6R | 3.1 | 62.2 | 6R | 5.9 | | |
| Embodiment 3 | 0.45 | 6R | 3.1 | 55.2 | 6R | 5.2 | | |
| Embodiment 4 | 0.45 | 6R | 3.1 | 70.0 | 6R | 6.5 | | |
| Embodiment 5 | 0.43 | 6R | 3.1 | 57.1 | 6R | 6.1 | 7 | 15R |
| Embodiment 6 | 0.51 | 9R | 4.0 | 58.5 | 9R | 7.0 | 5 | 20R |
| Embodiment 7 | 0.42 | 6R | 2.6 | 64.4 | 6R | 5.6 | | |
| Embodiment 8 | 0.51 | 6R | 3.3 | 64.4 | 6R | 6.3 | | |
| Embodiment 9 | 0.45 | 6R | 3.1 | 64.4 | 6R | 6.1 | | |
| Embodiment 10 | 0.43 | 6R | 3.1 | 64.4 | 6R | 6.1 | | |
| Embodiment 11 | 0.48 | 6R | 3.0 | 64.4 | 6R | 6.0 | | |
| Embodiment 12 | 0.44 | 6R | 4.2 | 64.4 | 6R | 7.2 | | |
| Embodiment 13 | 0.41 | 6R | 3.0 | 64.4 | 6R | 6.0 | | |
| Embodiment 14 | 0.41 | 6R | 3.2 | 64.4 | 6R | 6.2 | | |
| Embodiment 15 | 0.40 | 6R | 3.4 | 64.4 | 6R | 6.4 | | |
| Embodiment 16 | 0.41 | 6R | 3.4 | 64.4 | 6R | 6.4 | | |
| Embodiment 17 | 0.44 | 6R | 2.9 | 64.4 | 6R | 5.9 | | |
| Embodiment 18 | 0.44 | 6R | 3.1 | 64.4 | 6R | 6.1 | | |
| Embodiment 19 | 0.45 | 6R | 3.3 | 64.4 | 6R | 6.3 | | |
| Embodiment 20 | 0.43 | 6R | 2.5 | 64.4 | 6R | 5.5 | | |
| Embodiment 21 | 0.45 | 6R | 3.9 | 64.4 | 6R | 6.9 | | |
| Embodiment 22 | 0.49 | 6R | 3.9 | 64.4 | 6R | 6.9 | | |
| Embodiment 23 | 0.41 | 6R | 2.9 | 64.4 | 6R | 5.9 | | |
| Embodiment 24 | 0.45 | 6R | 3.0 | 64.4 | 6R | 6.0 | | |
| Embodiment 25 | 0.45 | 6R | 2.9 | 64.4 | 6R | 5.9 | | |
| Embodiment 26 | 0.44 | 9R | 3.5 | 64.4 | 9R | 6.5 | 12 | 20R |
| Embodiment 27 | 0.44 | 9R | 4.0 | 64.4 | 9R | 7.0 | 11 | 20R |
| Comparative Example 1 | 0.46 | 6R | 2.5 | 64.4 | 6R | 5.5 | 50 | 15R |
| Comparative Example 2 | 0.45 | 9R | 20 or more x | 66.5 | 9R | 20 or more x | 45 | 100R |
| Comparative Example 3 | 0.56 | 9R | 20 or more x | 64.4 | 9R | 20 or more x | 52 | 75R |
| Comparative Example 4 | 0.49 | 9R | 20 or more x | 64.4 | 9R | 20 or more x | 49 | 75R |

Curls in Embodiments 1, 5, 6, 26, and 27 were significantly smaller than those in Comparative Examples 1 to 4. The bending performance at normal temperature in Embodiments 1, 5, 6, 26, and 27 are significantly superior to those in Comparative Examples 2 to 4.

What is claimed is:

1. A decorative sheet comprising:
    a decorative plate; and
    an adhesive layer disposed on a first side of the decorative plate, the decorative plate comprising:
        (A) a decorative layer existing on an opposite side from the first side;
        (B) a core layer made of a prepreg containing a fiber base material and an acrylic resin emulsion having a glass transition temperature (Tg) of 0° C. or more; and
        (C) a balancing layer including mixed paper containing an endothermic metal hydroxide as a base material, wherein the balancing layer (C) contains a thermosetting resin and the endothermic metal hydroxide is mixed in with pulp used to form the mixed paper.

2. The decorative sheet according to claim 1, wherein the balancing layer (C) is disposed between the decorative layer (A) and the core layer (B).

3. The decorative sheet according to claim 1, wherein an amount of the thermosetting resin contained in the balancing layer (C) is 5.5 to 55 g/m².

4. The decorative sheet according to claim 1, wherein the thermosetting resin contained in the balancing layer (C) is a vinyl ester resin.

5. The decorative sheet according to claim 1, wherein the core layer (B) contains a flame retardant.

6. The decorative sheet according to claim 5, wherein an amount of the flame retardant in the core layer (B) is 1 to 100 g/m².

7. The decorative sheet according to claim 5, wherein at least a portion of the flame retardant contained in the core layer (B) is one of a nitrogen flame retardant or a phosphorus-nitrogen flame retardant.

8. The decorative sheet according to claim 7, wherein content of the nitrogen in the phosphorus-nitrogen flame retardant is 1 to 50% by mass.

9. The decorative sheet according to claim 1, wherein a thickness of the decorative sheet is 0.3 to 2.0 mm.

* * * * *